(12) United States Patent
Brey et al.

(10) Patent No.: US 7,260,487 B2
(45) Date of Patent: Aug. 21, 2007

(54) HISTOGRAM DIFFERENCE METHOD AND SYSTEM FOR POWER/PERFORMANCE MEASUREMENT AND MANAGEMENT

(75) Inventors: Thomas M. Brey, Cary, NC (US); Charles R. Lefurgy, Round Rock, TX (US); Mark A. Rinaldi, Durham, NC (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/289,249

(22) Filed: Nov. 29, 2005

(65) Prior Publication Data

US 2007/0124094 A1    May 31, 2007

(51) Int. Cl.
*G06F 19/00* (2006.01)
(52) U.S. Cl. ............... 702/60; 702/61; 702/181; 702/182; 702/187; 702/188; 700/22
(58) Field of Classification Search .......... 702/60, 702/61, 181, 182, 187, 188; 382/170; 713/300, 713/320
See application file for complete search history.

(56) References Cited

U.S. PATENT DOCUMENTS 5,216,623 A * 6/1993 Barrett et al. .......... 702/62

2002/0196974 A1 * 12/2002 Qi et al. ............... 382/170
2005/0125703 A1   6/2005 Lefurgy et al.

OTHER PUBLICATIONS

US 11/032,877 Desai, et al.

* cited by examiner

*Primary Examiner*—Hal Wachsman
*Assistant Examiner*—Phuong Huynh
(74) *Attorney, Agent, or Firm*—Mitch Harris, LLC; Andrew M. Harris; Casimer K. Salys

(57) ABSTRACT

A histogram difference method and system for power/performance measurement and management has low data storage requirements while supporting multiple monitoring applications having different update rates. Histogram data for power usage and/or performance mode is collected at a predetermined rate and the histogram data is read out at periodic intervals by the monitoring applications. The monitoring applications subtract the histogram data from previously read histogram data set to determine a interval difference histogram. The minimum and maximum values for the interval are the lowest-valued and highest-valued bin in the interval difference histogram that have a count greater than zero. The average value for the interval is the mean of the interval difference histogram. A conservative bound of the maximum and minimum values for a system can be determined by adding the values of the maximum and minimum values determined for each subsystem in the system.

20 Claims, 4 Drawing Sheets

HISTOGRAM DIFFERENCE METHOD AND SYSTEM FOR POWER/PERFORMANCE MEASUREMENT AND MANAGEMENT

CROSS-REFERENCE TO RELATED APPLICATIONS

The present application is related to previously-filed co-pending U.S. patent applications: Ser. No. 10/727,320, filed on Dec. 3, 2003, Pub. No. US20050125703-A1 entitled "METHOD AND SYSTEM FOR POWER MANAGEMENT INCLUDING LOCAL BOUNDING OF DEVICE GROUP POWER CONSUMPTION" and Ser. No. 11/032,877, filed on Jan. 1, 2005 entitled "METHOD, SYSTEM AND CALIBRATION TECHNIQUE FOR POWER MEASUREMENT AND MANAGEMENT OVER MULTIPLE TIME FRAMES." Each of the above-referenced U.S. patent applications have at least one inventor in common with the present application and are assigned to the same assignee. The specifications of the above-referenced patent applications are incorporated herein by reference.

BACKGROUND OF THE INVENTION

1. Technical Field

The present invention relates generally to power/performance measurement and management in processing systems, and more particularly, to a power/performance measurement scheme that can determine average, minimum and maximum power and/or performance levels over multiple and arbitrary interval sizes from a small accumulated data set.

2. Description of the Related Art

Multiple processor servers and other medium to large-scale processing systems are increasingly incorporating sophisticated power measurement and management subsystems. Even operating systems executing within uniprocessor workstation systems, such as notebook computers that employ selectable or automatically selected power conservation modes, may benefit from monitoring software that displays the power consumption and/or performance history of the system.

Power and performance monitoring applications in external monitors and internally executing applications may have requirements for information update rates that differ substantially and multiple applications may require data simultaneously (e.g., in overlapping intervals). The internal power/performance monitoring subsystem typically has to store data at a rate higher than that corresponding to the shortest power/performance update interval of the monitor, and for accurate results, the update rate must either match each required data output rate or represent sufficient oversampling for accuracy. Such data storage requirements are undesirable, especially when a service processor is used to accumulate the data and the associated storage is limited. While the monitoring application may have no such constraints on its memory usage, it is also undesirable to have a high update bandwidth between the power/performance monitor and the application, as the service processor communications channel is typically used for other applications and is a limited resource. In a system without a service processor, it is typically undesirable to task a system processor at a high rate just to collect power/performance data.

It is therefore desirable to provide a method and system for collecting and processing power usage/performance mode data that provides for arbitrary update rates and for serving multiple applications and/or external monitors without requiring large data storage.

SUMMARY OF THE INVENTION

The objective of providing arbitrary update rates for multiple applications and low storage requirements for power and performance monitoring is achieved in a method and system.

The method and system may be embodied in program instructions forming a computer program product for execution by a service processor and/or a system routine in a single or multi-processor system.

The method and system collect power usage and/or performance mode data in histograms, incrementing a bin corresponding to the data value or range in which the data value falls at the end of each sampling interval. Multiple measurement rates are supported by reading the histogram data at regular intervals from a monitoring application. The monitoring application subtracts a histogram data set from a previous histogram data set to determine an interval difference histogram. The maximum and minimum power and/or performance mode for the interval can be determined from the maximum and minimum-valued non-zero bins of the difference histogram and the average value for the interval determined from the mean value of the difference histogram.

The maximum and minimum bounds for multiple sub-systems can be estimated by gathering interval difference histograms for each sub-system, finding the maximum and minimum extrema for each adding them to provide a conservative bound of the maximum and minimum power/performance over each interval for the total system. An average value for the entire system can be estimated by adding the means of all the interval difference histograms or by use of an independent energy counter.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns a technique for power usage measurement that supports multiple monitoring applications that may require power history data simultaneously and may require measurements over differing time intervals.

The technique provides the history data without requiring a large amount of memory or a high rate of power measurement device polling. The technique maintains a histogram of power usage and/or performance level (generally a power savings mode level) values, and thus the only memory required is for counters to count the occurrences of measurements for a plurality of histogram bins. Each bin corresponds to a discrete value or range of values of the measured value(s) and the counters are sized sufficient to avoid a complete wrap-around between polls of the longest supported polling interval. Counter overflow is tolerated as long as overflow is detectable, which can be achieved as long as the maximum counter value is not met for any individual value count from one histogram reading to the next for any monitoring application.

Applications can read the histogram data set at an arbitrary rate and store the previous histogram in order to determine an interval histogram by subtracting the stored histogram. A histogram data set is retrieved at the beginning of an interval defined by the arbitrary rate and stored. At the end of the interval, a second histogram data set is read and the previously stored histogram data set is subtracted from the present data set. The subtraction yields an accurate histogram distribution for the arbitrary interval between the reading of the histogram data sets. The maximum, minimum and average power consumption/power mode values for the interval can then be determined from the interval histogram.

If the system being monitored includes multiple subsystems having a power measurement facility that accumulates local histogram data, then interval histograms can be determined for each of the subsystems and a conservative maximum and/or minimum bound established by adding the values of the maximum power bin and/or minimum power bin for each interval and the average power for the system estimated by adding the average for each subsystem.

Figure 1:
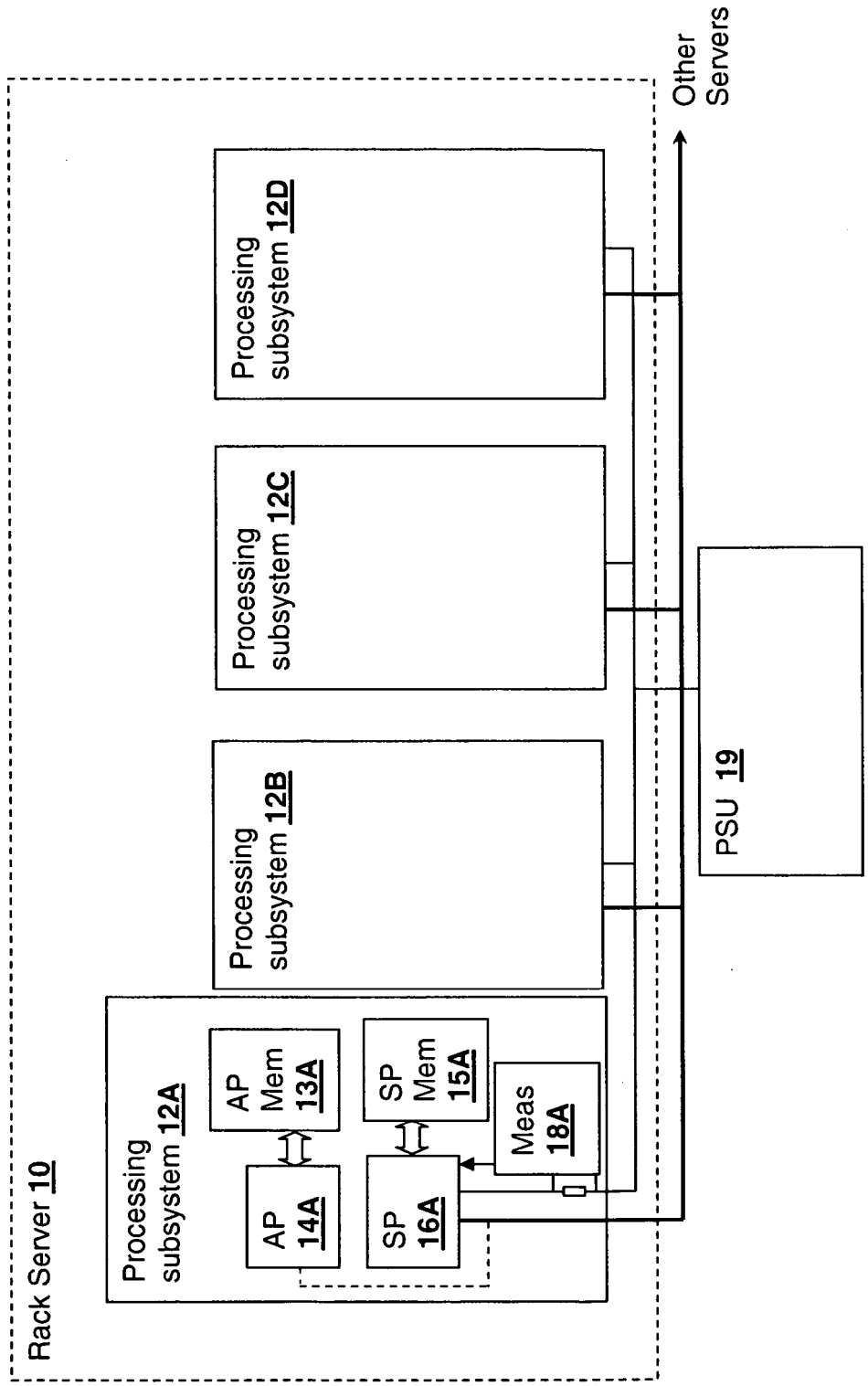
FIG. 1 is a block diagram of a computing system in accordance with an embodiment of the invention.

Referring now to FIG. 1, a processing system is depicted in accordance with an embodiment of the present invention. Processing subsystems 12A-12D illustrate identical subunits of the overall system, rack server 10, and interconnection between processing subsystems 12A-12D is not provided in detail, nor are connections to peripheral devices. However, it should be understood that such connections and devices generally exist in processing systems and that the techniques of the present invention can be applied to peripheral devices within an processing system as well as electronic systems in general. Further, the techniques of the present invention can be applied to large-scale systems encompassing multiple rack servers 10 or other groups of computing systems that may or may not be located in the same facility, as long as the power usage information can be communicated to a power measurement application. Further, the techniques of the present invention can be "nested". Interval histograms can be obtained at each level up a system hierarchy and the interval histograms can be combined and provided to a next higher level as long as the intervals are sufficiently overlapping for accuracy.

Within processing subsystem 12A, an application processor (AP) 14A is coupled to an application memory (AP Mem) 13A, which generally represent the processor and storage per processing system or "blade" that run operating environments, virtual machines, server instances and/or other tasks associated with the primary functions of the computing system. Also within processing system 12A, a service processor (SP) 16A provides control and monitoring functions for the processing system 12A including in the present embodiment, the accumulation and provision of power consumption and/or power mode histogram data. Service processor 16A is coupled to a service processor memory (SP Mem) 15A that stores service processor program instructions and data, including the histogram-accumulating code and histogram data of the present invention. Since service processor memory 15A is generally a limited resource, the present invention provides an advantage in that power usage history can be supplied to multiple applications at arbitrary intervals without increasing the storage size required for service processor memory 15A.

The monitoring application that polls service processor 16A and service processors within other subsystems, and obtains and processes the histogram data may be an external computer system, or an application executing within an environment (virtual machine or operating system instance) within one or more of processing systems 12A-12D. The monitoring application(s) may include pure monitoring applications for producing a display of system power consumption and/or power mode history, and may also include power control applications that use the data provided by the techniques of the present invention to tailor system power consumption by controlling operating modes of processing subsystems 12A-12D.

A power supply unit (PSU) 19 provides power to processing subsystems 12A-12D and may comprise more than one power supply unit operating in tandem or may supply power to separate partitions of the system. A power measuring unit 18A is shown within processing subsystem 12A, and is also present in other subsystems 12B-12D. Power measurement may be incorporated within PSU 19, and may also incorporate the techniques of the present invention in order to reduce data storage requirements and to provided power usage data at arbitrary intervals to multiple simultaneous monitoring applications. In general, the present invention may be applied to any system where it is desirable or required to provide power usage data at arbitrary intervals and/or to multiple applications where the read of the power usage data by one monitoring application cannot be permitted to affect the data read by another application. The power usage of processing subsystems 12A-12D may alternatively or in concert be determined by observing the operating mode of the processor(s) within subsystems 12A-12D. For example, the XEON processor (a product of Intel Corporation) includes multiple power level operating modes that permit programming of 8 different clock-throttling power control modes corresponding to even increments of the maximum frequency. By monitoring the power savings mode of each processor, an estimate of power usage for each subsystem can be accumulated and the power usage measured using the histogram techniques of the present invention. (In the XEON example, only 8 bins would be required to perform accumulation of the power control mode.)

While the figure provides a concrete example of an architecture that implements the above-described power usage measurement, the depicted architecture should not be construed as limiting. For example, a uniprocessor system may also be monitored, just as each subsystem is independently monitored in the above-described embodiment.

Figure 2:
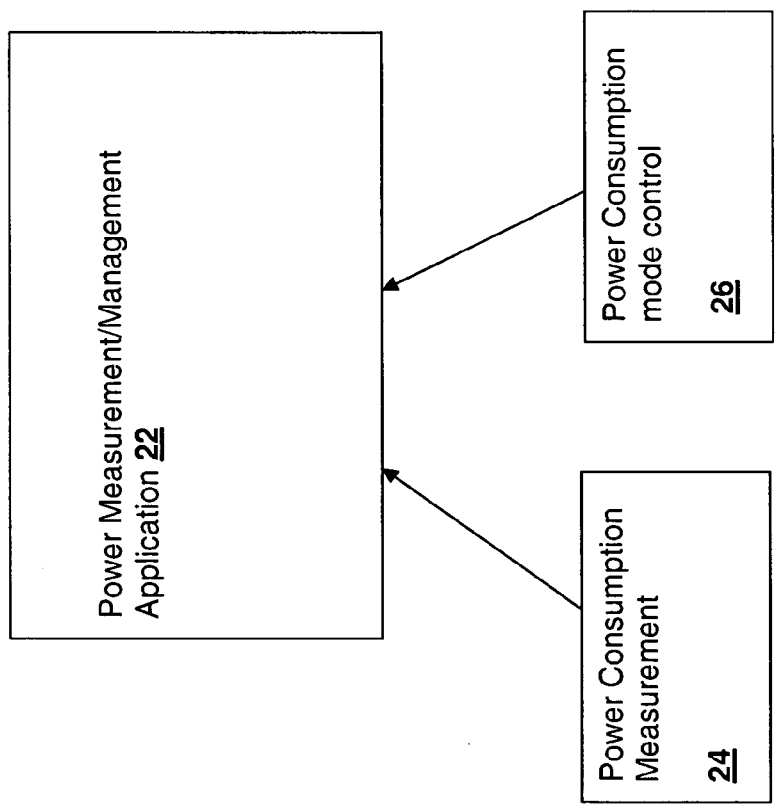
FIG. 2 is a software organization diagram of a computing system in accordance with an embodiment of the invention.

Referring now to FIG. 2, an organization of programs implementing the method of the present invention within the system of FIG. 1 is illustrated. A power measurement/ management application 22 as described above polls a power consumption measurement program 24 and/or a power consumption mode control 26 program that provide a histogram data set in response to each poll. Power consumption measurement program 24 provides histograms of counts of values. The values correspond to ranges of power consumption with the count in each particular bin representing the number of times that the power consumption of the subsystem has fallen within the range corresponding the particular bin since the last time that the bin counter rolled over. One bin counter is incremented at each sampling interval, where the sampling interval is generally substantially shorter than the polling interval at which the histogram data is polled. Power consumption mode control 26 can provide similar counts of power consumption mode in order to provide a histogram that also represents power usage of the associated subsystem. While power measurement/management application 22 is representative of a single instance for the system of FIG. 1, multiple applications may be polling the histogram data for specific functions (such as system power control or power usage display). Power consumption measurement program 24 and/or power consumption mode control 26 programs are representative of multiple instances, generally one for each subsystem and executed by a service processor, e.g. service processor 16A.

Figure 3:
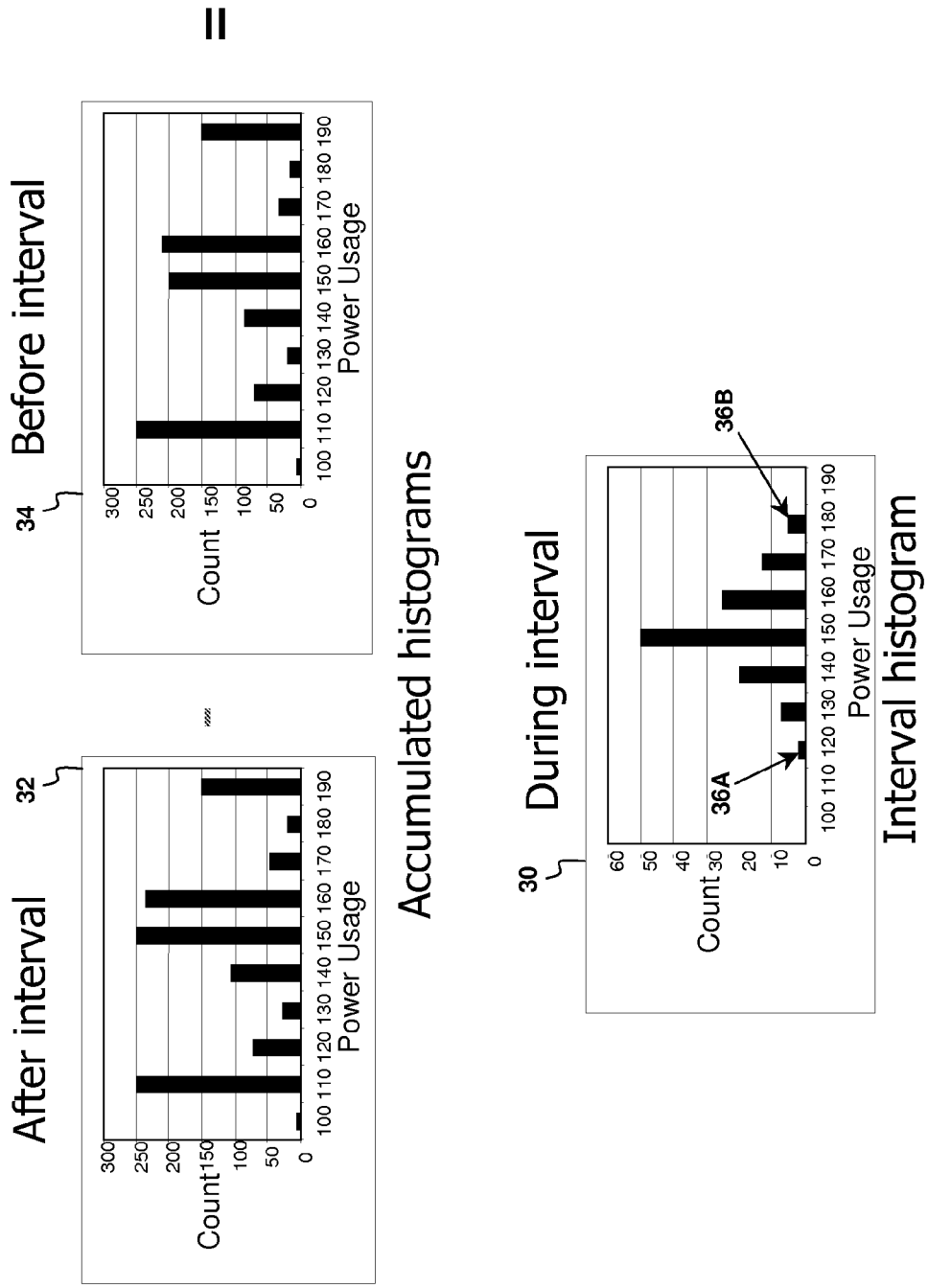
FIG. 3 is a pictorial diagram depicting a histogram difference method in accordance with an embodiment of the invention.

Referring now to FIG. 3, use of and operations on histogram data in accordance with an embodiment of the present invention are illustrated. At the end of an arbitrary measurement interval, histogram data set 32 is read from a subsystem. A previously stored histogram data set 34 from the beginning of the arbitrary measurement interval is then subtracted from histogram data set 32 to yield an interval difference histogram 30. The subtraction operation is performed by subtracting the count value for each bin in the more recent histogram data set from the corresponding bin in the stored histogram data set. The resulting interval difference histogram 30 represents a true histogram of the frequency of values within each histogram range for the interval between the times at which the histogram data sets are read by the polling application. The value (conservatively estimated as the range minimum) associated with the minimum non-zero bin 36A represents the minimum value of power usage during the interval, and the value (conservatively estimated as the range maximum) associated with the maximum non-zero bin value 36B yields the power usage maximum. The mean of histogram 30, which can be obtained by multiplying each bin's count by the associated value, adding each product and then dividing by the number of bins, represents the average power consumption for the interval. A conservative bound of maximum and minimum power consumption for a total system over the interval can be estimated by totaling the maximum 36B and minimum 36A values and the system average power can be estimated by summing the mean values of the histograms. However, a more accurate subsystem and total system average power can be produced in conjunction with the histogram data by keeping a total energy count in each subsystem, reading the total energy count along with the histogram data at the beginning and end of each interval and subtracting the total energy count values to find the energy used for the interval. The power consumed can be found by dividing the energy used by the interval duration.

The resolution of the measurement may be increased by increasing the number of bins, as long as the input value has higher resolution. The number of bins employed is dictated by the desired histogram resolution and the minimum and maximum possible power and/or mode values for the associated subsystem. The size of each bin counter must be such that a complete count cannot occur between the polls for the slowest polling application. For example, with a is data update rate, a 2-byte counter can produce a complete count in 18.2 hours. (A complete wraparound of that counter would only occur in 18.2 hours if only that bin were incremented, i.e., if the power usage remained constant over the entire 18.2 hour interval). Note that mere overflow is not a problem, as the absolute value of the count difference will yield the proper count value, while a complete wraparound will introduce an ambiguity that can mask a full count value plus one as a zero count value.

The accuracy of the total system values of the present invention is dependent somewhat on the rate at which the histogram data can be read from the subsystems. In particular, for the total system maximum/minimum bound estimates and the system average power (if estimated by adding the histogram means) there will be delays between the intervals for which the histogram data is valid for each subsystem. Thus, the maximum/minimum bound is completely valid only for the interval for which the histogram intervals overlap and the total average may deviate from the true total average power for an interval. However, since the power measurement application can generally store large numbers of histograms and can store the histograms for each subsystem, an accurate minimum and maximum power bound for a given moment in time can be found by locating the proper interval histogram on each subsystem and combining the minimum and maximum power levels over the located intervals. Similarly, if the maximum and minimum bounds must be found for a fixed interval and that interval spans more than one subsystem histogram's valid interval, the maximum and minimum levels can be found across all the totality of the histograms spanning the interval and the bounds for the total system conservatively estimated from those levels.

Figure 4:
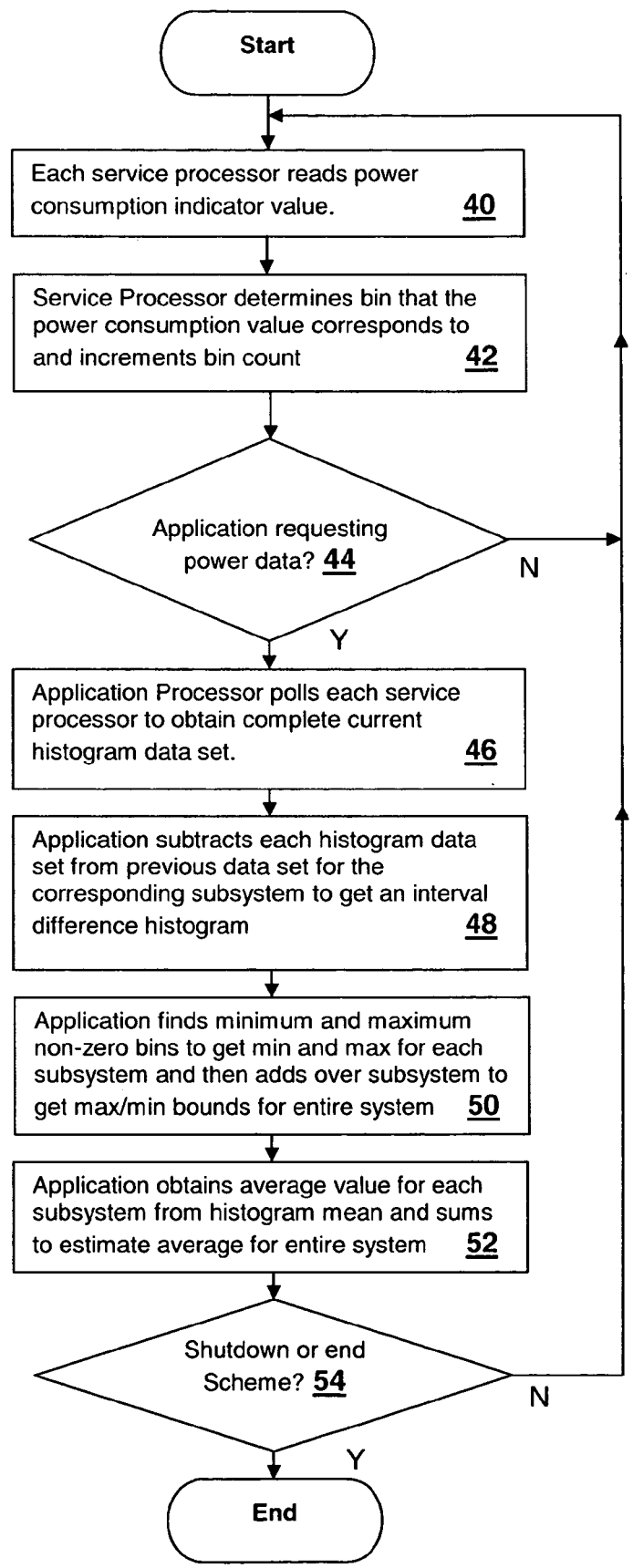
FIG. 4 is a flowchart depicting a method in accordance with an embodiment of the present invention.

Referring now to FIG. 4, a power measurement method in accordance with an embodiment of the invention is depicted in a flowchart. First (step 40) each service processor reads the power consumption indicator indictor (e.g., measured power or power mode) (step 40). The service processor determines the bin that the value corresponds to and increments the bin count (step 42). Unless an application is requesting power data (decision 44), steps 40 and 42 are repeated, updating the histogram. When an application requests power data (decision 44), the application polls each service processor to obtain complete current histogram count values (step 46). The application subtracts each histogram data set from the previous data set for the corresponding subsystem to get the interval difference histograms (step 48). The application then finds the maximum and minimum non-zero bins to get the maximum and minimum for each subsystem and adds them over the subsystems to get the max/min bounds for the entire system (step 50). The application then obtains the average value for each subsystem from computing the histogram mean, and sums the means to estimate the average for the entire system (step 52). Until the system is shutdown or the scheme is ended, steps 40-54 are repeated.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A computer performed method of measuring a power consumption indicator over an arbitrary interval in an electronic system, comprising:

accumulating counts of values of said power consumption indicator at a predetermined rate in corresponding ones of a plurality of storage locations of a computer system corresponding to a histogram, wherein said power consumption indicator is a measured power consumption value or a power consumption mode value for said electronic system;

first reading a first histogram data set from said storage locations at a beginning of said arbitrary interval;

second reading a second histogram data set from said storage locations at an end of said arbitrary interval;

subtracting said first histogram data set from said second histogram data set to form an interval difference histogram; and displaying results determined in conformity with a result of said subtracting or performing power control within said electronic system in conformity with a result of said subtracting.

2. The method of claim 1, further comprising finding a minimum value of said power consumption indicator over said arbitrary interval by locating the lowest-valued non-zero bin of said interval difference histogram.

3. The method of claim 1, further comprising finding a maximum value of said power consumption indicator over said arbitrary interval by locating the highest-valued non-zero bin of said interval difference histogram.

4. The method of claim 1, further comprising finding an average value of said power consumption indicator over said arbitrary interval by computing a mean value of said interval difference histogram.

5. The method of claim 1, wherein said power consumption indicator is said measured power consumption value for said electronic system.

6. The method of claim 1, wherein said power consumption indicator is said power consumption mode value for said electronic system.

7. The method of claim 1, wherein said electronic system comprises a plurality of subsystems, wherein said accumulating, said first reading, said second reading and subtracting are performed for each of said subsystems.

8. The method of claim 7, further comprising finding a minimum bound of a total of said power consumption indicator for a given instant in time by:

finding a minimum value of said power consumption indicator over a particular interval for each of said subsystems by locating the particular interval containing said given instant in time for each of said subsystems;

for each of said subsystems, finding a lowest-valued non-zero bin of an interval difference histogram corresponding to said particular interval to determine a minimum value for each subsystem; and adding the minimum values for each of said subsystems to determine said minimum bound.

9. The method of claim 7, further comprising finding a maximum bound of a total of said power consumption indicator for a given instant in time by:

finding a maximum value of said power consumption indicator over a particular interval for each of said subsystems by locating the particular interval containing said given instant in time for each of said subsystems;

for each of said subsystems, finding a highest-valued non-zero bin of an interval difference histogram corresponding to said particular interval to determine a maximum value for each subsystem; and adding the maximum values for each of said subsystems to determine said maximum bound.

10. A system, comprising at least one processor coupled to at least one memory for storing program instructions for execution by said processor and data corresponding to a histogram of power consumption indicator of said system, said data comprising a plurality of count values assigned to ranges of values of said power consumption indicator, and wherein said program instructions comprise program instructions for:

accumulating counts of values of said power consumption indicator at a predetermined rate in corresponding ones of a plurality of storage locations corresponding to a histogram, wherein said power consumption indicator is a measured power consumption value or a power consumption mode value for said electronic system;

reading a first histogram data set from said storage locations at a beginning of said arbitrary interval and a second histogram data set at an end of said arbitrary interval;

subtracting said first histogram data set from said second histogram data set to form an interval difference histogram; and displaying results determined in conformity with a result of said subtracting or performing power control within said electronic system in conformity with a result of said subtracting.

11. The system of claim 10, wherein said at least one processor comprises a service processor coupled to a service processor memory and an application processor coupled to an application memory, wherein said program instructions for accumulating and reading are stored in said service processor memory and executed by said service processor, wherein said program instructions for subtracting are stored in said application memory and executed by said application processor, and wherein said program instructions stored in said application memory further comprise program instructions for polling said service processor to supply histogram data, wherein said application processor executes said program instructions for polling at said start and end of said arbitrary interval and wherein said service processor executes said program instructions for reading in response to said polling, whereby said service processor supplies said first and second histogram data set to said application processor.

12. The system of claim 11, wherein said service processor and said application processor are located in a first subsystem and wherein said system further comprises at least one other subsystem having at least one other service processor and at least one other application processor, and wherein said application processor polls each of said service processors to obtain a plurality of pairs of said first and second histogram data sets, one for each of said subsystems and executes said program instructions for subtracting over each of said pairs of histogram data sets.

13. The system of claim 12, wherein said application memory further comprises additional program instructions executed by said application processor for finding a minimum bound of a total of said power consumption indicator for a given instant in time, and wherein said additional program instructions comprise program instructions for:

finding a minimum value of said power consumption indicator over a particular interval for each of said subsystems by locating the particular interval containing said given instant in time for each of said subsystems;

for each of said subsystems, finding a lowest-valued non-zero bin of an interval difference histogram corresponding to said particular interval to determine a minimum value for each subsystem; and adding the minimum values for each of said subsystems to determine said minimum bound.

14. The system of claim 12, wherein said application memory further comprises additional program instructions executed by said application processor for finding a maximum bound of a total of said power consumption indicator for a given instant in time, and wherein said additional program instructions comprise program instructions for:

finding a maximum value of said power consumption indicator over a particular interval for each of said subsystems by locating the particular interval containing said given instant in time for each of said subsystems;

for each of said subsystems, finding a highest-valued non-zero bin of an interval difference histogram corresponding to said particular interval to determine a maximum value for each subsystem; and adding the maximum values for each of said subsystems to determine said maximum bound.

15. The system of claim 10, wherein said program instructions further comprise program instructions for finding a minimum value of said power consumption indicator over said arbitrary interval by locating the lowest-valued non-zero bin of said interval difference histogram.

16. The system of claim 10, wherein said program instructions further comprise program instructions for finding a maximum value of said power consumption indicator over said arbitrary interval by locating the highest-valued non-zero bin of said interval difference histogram.

17. The system of claim 10, wherein said program instructions further comprise program instructions for finding an average value of said power consumption indicator over said arbitrary interval by computing a mean value of said interval difference histogram.

18. The system of claim 10, wherein said power consumption indicator is said measured power consumption value for said electronic system.

19. The system of claim 10, wherein said power consumption indicator is said power consumption mode value for said electronic system.

20. A computer program product comprising computer readable storage media encoding program instructions for execution by a processor, said program instructions comprising:

reading a first histogram data set comprising accumulated counts of values of a power consumption indicator of an electronic system at a beginning of an arbitrary interval, wherein said power consumption indicator is a measured power consumption value or a power consumption mode value for said electronic system;

reading a second histogram data set comprising further accumulated counts of values of a power consumption indicator of an electronic system at an end of said arbitrary interval;

subtracting said first histogram data set from said second histogram data set to determine an interval difference histogram; and displaying results determined in conformity with a result of said subtracting or performing power control within said electronic system in conformity with a result of said subtracting.

\* \* \* \* \*